United States Patent
Wagner

[11] Patent Number: 6,106,232
[45] Date of Patent: Aug. 22, 2000

[54] PROPELLER STRUCTURE

[76] Inventor: Thomas V. Wagner, 300 S. Moorpark Ave., #406, Moorpark, Calif. 93021

[21] Appl. No.: 09/031,254

[22] Filed: Feb. 26, 1998

[51] Int. Cl.$^7$ .................................................. B63H 1/20
[52] U.S. Cl. ........................ 416/202; 416/237; 416/238; 416/175
[58] Field of Search ................... 416/202, 235, 416/237, 238, 175

[56] References Cited

U.S. PATENT DOCUMENTS

| | | | |
|---|---|---|---|
| 1,733,251 | 10/1929 | Deering | 416/238 |
| 3,333,831 | 8/1967 | Chapman | 416/237 |

FOREIGN PATENT DOCUMENTS

| | | | |
|---|---|---|---|
| 1065181 | 5/1954 | France | 416/238 |
| 130983 | 2/1921 | United Kingdom | 416/237 |

Primary Examiner—Edward K. Look
Assistant Examiner—Richard Woo
Attorney, Agent, or Firm—Freilich, Hornbaker & Rosen

[57] ABSTRACT

A propeller used to interact with a fluid to either move the fluid, e.g., a fan or generate thrust for propulsion, e.g., for an aircraft or boat. The propeller is characterized by at least first and second planar blades configured for mounting on a propeller shaft. Each of the planar blades defines a periphery including (1) a trailing edge lying substantially in a common plane oriented perpendicular to the propeller shaft and (2) a leading edge inclined at an angle of A° relative to the common plane so that the midpoint of the leading edge is axially displaced, relative to the propeller shaft, from the midpoint of the trailing edge.

6 Claims, 1 Drawing Sheet

PROPELLER STRUCTURE

BACKGROUND OF THE INVENTION

This invention relates generally to propellers used to interact with a fluid either to generate thrust for propulsion, e.g., for an aircraft or boat, or to move the fluid, e.g., a fan.

SUMMARY OF THE INVENTION

The present invention is directed to an improved propeller structure for interacting with a surrounding fluid medium to generate thrust for propulsion of a craft, e.g., a full or model size aircraft or boat.

A propeller structure in accordance with the invention is characterized by at least first and second planar blades configured for mounting on a propeller shaft. Each of the planar blades defines a periphery including (1) a trailing edge lying substantially in a common plane oriented perpendicular to the propeller shaft and (2) a leading edge inclined at an angle of A° relative to the common plane so that the midpoint of the leading edge is axially displaced, relative to the propeller shaft, from the midpoint of the trailing edge. As a consequence, upon rotation of the propeller fluid will move across each planar blade surface, from the leading to the trailing edge thereof, to impart an axial thrust component to the fluid.

A preferred propeller structure in accordance with the invention comprises:

a hub defining a hub axis and a hub plane oriented substantially perpendicular to said hub axis, the hub being configured for attachment to a propeller shaft for rotation about said hub axis;

at least first and second planar blades attached to and extending substantially radially from said hub, the planar blades being inclined at an angle of A° with respect to said hub plane;

each of the planar blades defining a periphery including a straight leading edge, a straight trailing edge, and an arcuate outer edge; and wherein 1. the blade trailing edges are positioned substantially coincident with said hub plane; and
2. the blade leading edges are oriented at said angle A° with respect to said hub plane.

Embodiments of the invention can be readily fabricated from sheet steel by stamping and bending operations to yield an inexpensive but very efficient propeller structure.

DETAILED DESCRIPTION

Figure 1:
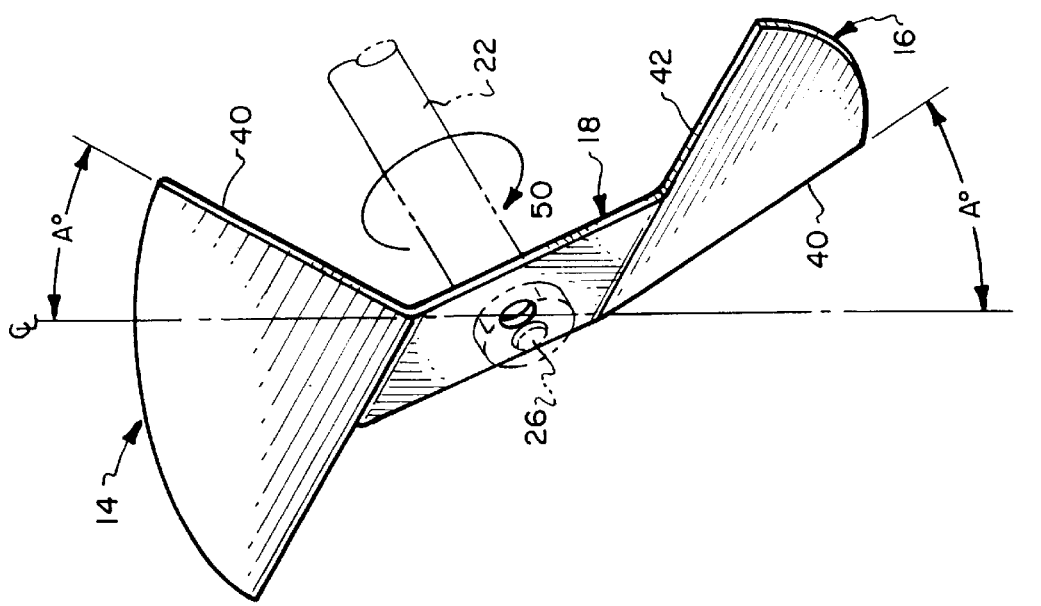
FIG. 1 comprises a rear view of an exemplary propeller in accordance with the invention showing two planar blades extending substantially radially from a central hub defining a hub axis.
Figure 2:
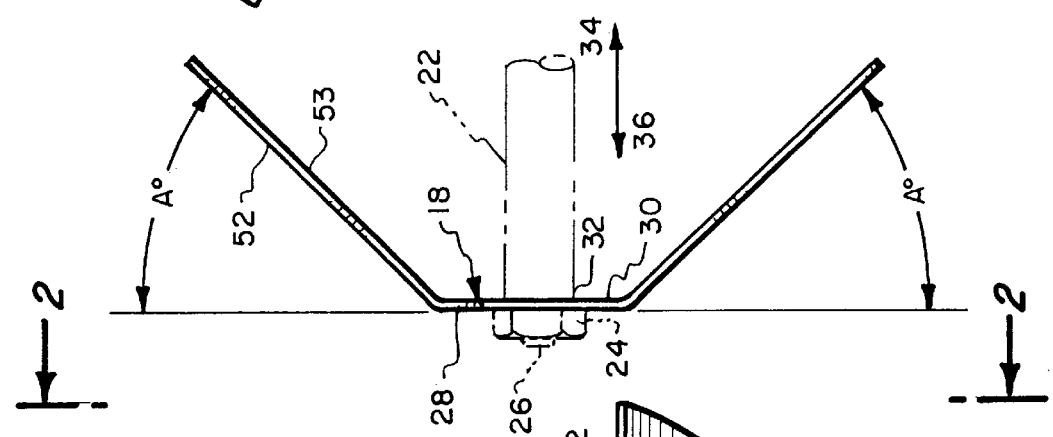
FIG. 2 is a side view of the propeller structure of FIG. 1 showing the two planar blades inclined forwardly from a common plane defined by the hub.
Figure 3:
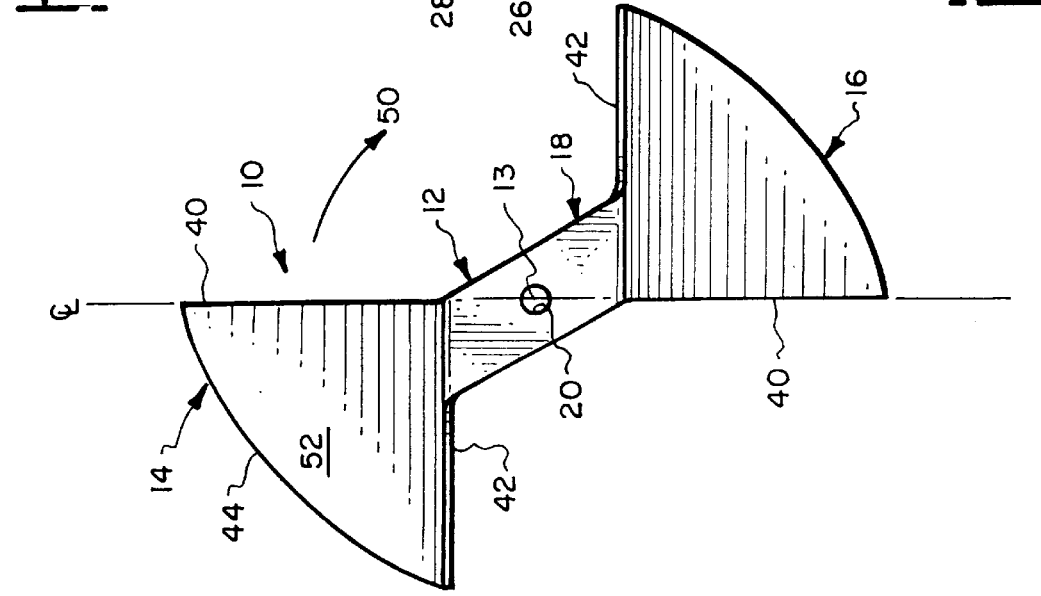
FIG. 3 is an isometric illustration of the propeller depicted in FIGS. 1 and 2.

Attention is now directed to FIGS. 1–3 which depict a preferred embodiment of propeller structure 10 in accordance with the present invention. The propeller structure 10 is essentially comprised of a hub 12 defining a hub axis 13, and two or more planar blades 14 and 16, attached to the hub 12 and extending substantially radially outwardly therefrom.

More particularly, the hub 12 is depicted as comprising a flat planar member 18 defining a common hub plane having a parallelogram shape periphery. A centrally located hole 20 extends through the member 18 and defines the hub axis 13. The hole 20 is configured to enable the propeller structure 10 to be fixed to a propeller shaft 22, as shown in FIG. 2, as by a nut 24 threaded onto shaft portion 26. The nut bears against the rear face 28 of hub member 18 forcing the front face 30 against the shaft shoulder 32. For purposes of explanation, it will be assumed that the propeller shaft 22 comprises a boat drive shaft and that the arrows 34 and 36 respectively point toward the bow and stern of the boat. The function of the propeller structure 10 is to produce an axial thrust component in the surrounding fluid medium, e.g. water, toward the rear 36 of the boat to thrust the boat forwardly.

The propeller blades 14 and 16 comprise flat planar members extending substantially radially outwardly from the hub 12. Each blade is inclined forwardly at an angle of A° relative to the common hub plane defined by member 18. Each of the blades 14 and 16 defines a periphery comprised of a straight leading edge 40, a straight trailing edge 42, and an arcuate edge 44 extending between the outer termination points of the leading and trailing edges. The respective leading edges 40 are preferably aligned and oriented so that extensions thereof intersect the hub axis 13. Each trailing edge 42 lies substantially in the common plane defined by the hub member 18. The leading and trailing edges 40 and 42 are preferably oriented substantially perpendicular to each other.

The propeller structure 10 is preferably formed by a single sheet of material, e.g. steel, stamped generally into the shape depicted in FIG. 1. The radially extending blades 14, 16 are then bent around the trailing edges 42 to an angle A° as represented in FIG. 2. In preferred embodiments of the invention, the angle A typically has a magnitude within the range of 1° to 45°.

In operation, when the boat shaft 22 is rotated (by a motor, not shown) in the direction of arrow 50, the blade leading edges 40 will cut through the surrounding fluid medium, i.e., water, directing the water over the flat blade surfaces 52 and 53 and discharging it over the trailing blade edge 42. Note that the midpoint of the straight leading edge 40 is axially forward of the midpoint of the trailing edge 42. Assuming, for simplicity in explanation, that the average unit of water passing over each blade surface enters at the midpoint of the leading edge 40 and exits at the midpoint of the trailing edge 42, it can then readily be seen that rotation of the propeller structure imparts a rearward axial component to the water in the direction represented by arrow 36. This action produces an opposite axial thrust, i.e., forward in the direction of arrow 34, on the shaft 22 and the craft mounted thereto.

The embodiment depicted in FIGS. 1–3 shows two blades, 14 and 16 displaced by 180°, i.e., 360°/2. Alternative embodiments of the invention can use a greater number of blades represented by the quantity n. In this case, the blades would be equally displaced around the hub axis 20 by a radial angle of 360°/n. It should be appreciated that embodiments of the invention can be fabricated of a variety of different materials appropriate to the intended application. Moreover, embodiments of the invention can be fabricated in a wide range of sizes, also dependent upon the intended application.

Although the present invention has been described in detail with reference to only a single embodiment, those of ordinary skill in the art will appreciate that various modifications can be made without departing from the spirit and scope of the invention as defined by the following claims.

What is claimed:

1. A propeller structure comprising:

a hub defining a hub axis and a hub plane substantially perpendicular to said hub axis, said hub being configured for attachment to a propeller shaft for rotation about said hub axis;

at least first and second planar blades attached to and extending substantially radially from said hub, said planar blades being inclined at an angle of A° with respect to said hub plane;

each of said planar blades defining a surface having a periphery including a substantially straight leading edge and a substantially straight trailing edge, said leading and trailing edges diverging with increasing radial distance from said hub axis and terminating in an arcuate outer edge; and wherein said blade trailing edges are positioned substantially coincident with said hub plane;

said blade leading edges are oriented at said angle A° with respect to said hub plane whereby points along said leading edges are axially displaced from said trailing edges to impart an axial component to fluid moving across said blade surfaces; and said blade leading edges are oriented so that a straight line extension thereof substantially intersect said hub axis.

2. The propeller structure of claim 1 including a plurality of n planar blades; and wherein said blade leading edges are respectively radially displaced around said hub axis by a radial angle 360°/n.

3. The propeller structure of claim 1 wherein the leading and trailing edges of each of said blades are oriented substantially perpendicular to each other.

4. The propeller structure of claim 1 wherein said angle A is within the range of 1° to 45°.

5. A propeller structure suitable for mounting on a rotatable propeller shaft for producing a fluid flow in a first axial direction, said propeller structure comprising:

a hub defining a hub axis and a hub plane oriented substantially perpendicular to said hub axis, said hub configured for mounting on a rotatable propeller shaft with said hub axis aligned with the axis of said propeller shaft;

at least one planar blade attached to and extending substantially radially from said hub;

said planar blade defining a substantially flat surface bounded by a periphery including a substantially straight leading edge and a substantially straight trailing edge, said leading and trailing edges diverging with increasing radial distance from said hub axis and terminating in an arcuate outer edge;

said blade trailing edge extending substantially perpendicular to said hub axis and substantially coincident with said hub plane;

said blade leading edge extending at an angle A° with respect to said hub plane, said leading edge defining inner and outer end point and intermediate points therebetween and wherein said intermediate points and said outer end points are axially displaced from said trailing edge to impart an axial thrust to fluid passing along said blade surface from said leading edge to said trailing edge; and said blade leading edge is oriented so that a straight line extension thereof substantially intersects said hub axis.

6. The propeller structure of claim 5 wherein said angle A° is within the range of 1° to 45°.

* * * * *